United States Patent
Grant

(10) Patent No.: US 8,233,517 B2
(45) Date of Patent: Jul. 31, 2012

(54) PILOT-BASED SINR ESTIMATION FOR MIMO SYSTEMS

(75) Inventor: Stephen Grant, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 444 days.

(21) Appl. No.: 12/510,529

(22) Filed: Jul. 28, 2009

(65) Prior Publication Data

US 2011/0026566 A1  Feb. 3, 2011

(51) Int. Cl.
*H04B 1/00* (2006.01)
(52) U.S. Cl. .......... 375/144; 375/347
(58) Field of Classification Search .......... 375/267, 375/299, 144, 148, 347, 348, 349
See application file for complete search history.

(56) References Cited

U.S. PATENT DOCUMENTS

| 2006/0159160 | A1* | 7/2006 | Kim et al. ............... 375/148 |
| 2007/0211815 | A1* | 9/2007 | Pan et al. ............... 375/267 |
| 2010/0081399 | A1* | 4/2010 | Zangi ............... 455/114.3 |
| 2010/0215075 | A1* | 8/2010 | Jonsson et al. ............... 375/130 |
| 2011/0060956 | A1* | 3/2011 | Goldsmith et al. ............... 714/746 |

FOREIGN PATENT DOCUMENTS

| WO | WO 2008/054267 A1 | 5/2008 |
| WO | WO 2009/106426 A1 | 9/2009 |

* cited by examiner

*Primary Examiner* — Emmanuel Bayard

(57) ABSTRACT

A combination of parametric and non-parametric approaches are disclosed for enabling pilot-based SINR estimation for MIMO systems. The pilot-based SINR estimation embodiments account for precoding applied during either single-stream or multi-stream data transmission. The pilot-based SINR estimation embodiments also account for code reuse interference which arises during multi-stream data transmission when spreading codes are reused on the data channel. Accordingly, mismatches that exist between the data channel and the pilot channel because of precoding and/or code reuse are inherently accounted for by the pilot-based SINR estimation embodiments disclosed herein.

22 Claims, 4 Drawing Sheets

PILOT-BASED SINR ESTIMATION FOR MIMO SYSTEMS

TECHNICAL FIELD

The present invention generally relates to SINR estimation in a wireless network, and more particularly relates to pilot-based SINR estimation for MIMO systems.

BACKGROUND

High-Speed Downlink Packet Access (HSDPA) is an enhanced 3G (third generation) mobile telephony communication protocol in the High-Speed Packet Access (HSPA) family. HSDPA uses both fast link adaptation and fast user scheduling for enabling very high data rates. Both techniques require the UE (use equipment) to feedback information to a Node B base station relating to the quality of the downlink channel observed by the UE. Typically, the UE determines the feedback information by estimating SINR (signal to interference-plus-noise ratio) on the downlink common pilot channel (CPICH) and then converting this to a channel quality indicator (CQI) using a look-up table. The look-up table contains a mapping of SINR to transport format (e.g., modulation type, coding rate, number of codes) and is defined in 3GPP TS 25.214, "Physical Layer Procedures (FDD)," Version 7.9.0, Release 7, July 2008.

For single-antenna systems, SINR is typically estimated using a CPICH-based approach as follows. First, a set of combining weights (e.g., Rake, G-Rake) appropriate for demodulation of the HS-DSCH (High Speed Downlink Shared Channel) is formulated. The combining weights are typically denoted by a vector w. Next, the common pilot is despread using the same finger placements (e.g., Rake fingers, G-Rake fingers, etc.) as used to formulate the combining weights. The sequence of despread vectors during a single slot is given by:

$$y(i) = h c_p(i) + x(i), \quad i = 1 \ldots K \tag{1}$$

where i indexes the K CPICH symbols transmitted during the time slot (K=10). Here $$c_p(i) = \frac{1}{\sqrt{2}}(i+j)$$

is a QPSK modulated pilot symbol known to the UE, h is the net channel response, and x(i) is a (zero mean) impairment vector consisting of interference and noise, referred to hereinafter as simply noise. The noise covariance is denoted $R_x$.

The combined CPICH despread values are given by:

$$z(i) = w^H y(i) \tag{2}$$
$$= w^H h c_p(i) + w^H x(i)$$

The first term in the expression of equation (2) is the desired signal component which has power given by the mean-squared value:

$$P_{sig} = E[|w^H h c_p(i)|^2] = |w^H h|^2 \tag{3}$$

The second term in the expression of equation (2) is a noise component which has power given by the variance:

$$P_{noise} = E[w^H x(i) x^H(i) w] = w^H R_x w \tag{4}$$

The true SINR value at the output of the combiner conditioned on the combining weights w is thus given by:

$$SINR_{true} = \frac{P_{sig}}{P_{noise}} = \frac{|w^H h|^2}{w^H R_x w} \tag{5}$$

The true SINR is a hypothetical value which is not typically computed at the receiver in practice, since the receiver only has available estimates of the net channel response h and the noise covariance $R_x$, not the true values themselves. The SINR can be estimated, however, using estimates $\hat{h}$ and $\hat{R}_x$ of the net channel response and noise covariance, respectively. Unbiased estimates are typically determined from the despread CPICH as follows:

$$\hat{h} = \frac{1}{K} \sum_{i=1}^{10} y_p(i) c_p^*(i) \tag{6}$$

and $$\hat{R}_x = \frac{1}{K-1} \sum_{i=1}^{10} \left[ y(i) c_p^*(i) - \hat{h} \right] \left[ y(i) c_p^*(i) - \hat{h} \right]^H \tag{7}$$

An unbiased estimate of the signal power is then typically obtained as:

$$\hat{P}_{sig} = |w^H \hat{h}|^2 - \frac{1}{K} w^H \hat{R}_x w \tag{8}$$

and an unbiased estimate of the noise power as:

$$\hat{P}_{noise} = w^H \hat{R}_x w \tag{9}$$

The subtractive term in the expression of equation (8) is responsible for removing bias in the signal power estimate that occurs due to noise in the estimate of the net response. Smoothing of the signal and noise power is typically performed over a number of slots resulting in the SINR estimate:

$$SINR_{est} = \frac{\langle \hat{P}_{sig} \rangle}{\langle \hat{P}_{noise} \rangle}, \tag{10}$$

where the operator $\langle \cdot \rangle$ indicates a time average (i.e. smoothing). The SINR estimate is then mapped to a CQI value and fed back on the uplink HS-DPCCH (High Speed Dedicated Physical Control Channel) to inform the Node B of the downlink channel quality.

Notably, the SINR estimate is implicitly scaled by the power allocated to the CPICH channel since the despread CPICH is used to estimate all quantities. However, to make reliable link adaptation and scheduling decisions, the Node B requires an estimate of the SINR that would be experienced on the HS-DSCH (data) channel. The data and pilot SINRs are related by a scale factor that is a function of the data-to-pilot power ratio which is known by the Node B, and the ratio of the spreading factors on the data and pilot channels which is also known by the Node B. Hence, the Node B can apply the known scale factor to convert the pilot SINR to a corresponding data SINR.

The conventional SINR estimation approach described above is completely non-parametric. That is, the CPICH is used to measure the SINR and thus takes into account the instantaneous intra-cell interference, inter-cell interference, noise, RF impairments, etc. without explicitly modeling them. However, the purely non-parametric CPICH-based SINR estimation technique described above is not well suited for multi-antenna systems.

MIMO systems (multiple-input, multiple-output) use multiple antennas at both the transmitter and receiver for improving communication performance. For example, a 2×2 MIMO system has been standardized for Rel-7 HSDPA. The standardized 2×2 MIMO scheme in Rel-7 HSDPA is referred to as Dual-Transmit-Adaptive-Arrays (D-TxAA). D-TxAA can be viewed as an extension of a previously standardized transmit diversity scheme called Closed-Loop Mode-1 (CL-1), in that precoding vectors used for each data stream are drawn from the same codebook as used for CL-1. In contrast to CL-1; however, D-TxAA has two modes of operation: single-stream mode and dual-stream. In single-stream mode, one of four possible precoding vectors from the CL-1 codebook is applied to a single data stream. In dual-stream mode, one of two possible orthogonal pairs of precoding vectors are applied to two different data streams. In the case of dual-stream transmission, the same set of channelization codes is used for each data stream.

Several problems exist with the conventional CPICH based SINR estimation approach described above when applied to MIMO systems. First, and most significant, is the additional interference created by the reuse of spreading codes on the HS-DSCH (data) channel when in dual-stream mode. Such so-called code-reuse interference does not exist on the CPICH (pilot) channel since the pilots transmitted on each antenna are orthogonal. Hence use of the conventional CPICH-based SINR estimation approach described above yields an over-estimate of data channel quality leading to excessively high block error rates and thus significantly reduced throughput. In addition, precoding is used on the HS-DSCH whereas no precoding is used on the CPICH. Precoding also affects SINR, hence SINR values calculated using the conventional CPICH-based SINR estimation approach described above yields an even more inaccurate representation of the data channel quality since precoding is not employed on the pilot channel upon which SINR is solely derived.

SUMMARY

According to the methods and apparatus disclosed herein, a combination of parametric and non-parametric approaches are described for enabling pilot-based SINR estimation for MIMO systems. Precoding can be applied to either single-stream or multi-stream data transmissions in a MIMO system. The pilot-based SINR estimation techniques disclosed herein account for the effect data stream precoding has on signal quality in a MIMO system. For multi-stream data transmissions, code reuse interference arises when spreading codes are reused on the data channel. The pilot-based SINR estimation techniques disclosed herein further estimate the effect code reuse interference has on signal quality in a MIMO system.

In one embodiment, noise power is estimated based on despread pilot symbols in a non-parametric fashion. An additional parametric term is provided depending on whether the UE is calculating an SINR estimate in single-stream or multi-stream mode. The additional parametric term estimates the code-reuse interference present on the data channel when configured in multi-stream mode. The parametric term is a function of the power per-code allocated to the data channel as well as the estimated effective net response "seen" by each data stream. The effective net response accounts for the precoding used on the data channel that does not occur on the pilot channel. The signal power is also estimated based on the despread pilot symbols as a function of the estimated effective net response. In this way, mismatches that exist between the data channel and pilot channel because of precoding and code reuse interference are inherently accounted for by the SINR estimation embodiments disclosed herein.

According to one embodiment, either a single data stream is transmitted from a plurality of antennas or multiple data streams are transmitted from the plurality of antennas using the same set of spreading codes for all streams. Regardless of the currently transmitted number of streams, SINR estimates are required for both single and multiple stream transmission. A method for estimating SINR for the single data stream and for the multiple data streams includes calculating a signal power estimate for the single data stream and for each of the multiple data streams that accounts for precoding applied to the corresponding data stream prior to transmission. A noise power estimate is calculated for the single data stream as a function of noise covariance and for each of the multiple data streams as a function of the noise covariance and code reuse interference associated with the multiple data streams transmitted using the same set of spreading codes. An SINR estimate is calculated for the single data stream and for each of the multiple data streams based on the signal power estimate and the noise power estimate calculated for the corresponding data stream. According to another embodiment, a wireless receiver including a baseband processor is provided for practicing the SINR estimation method.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
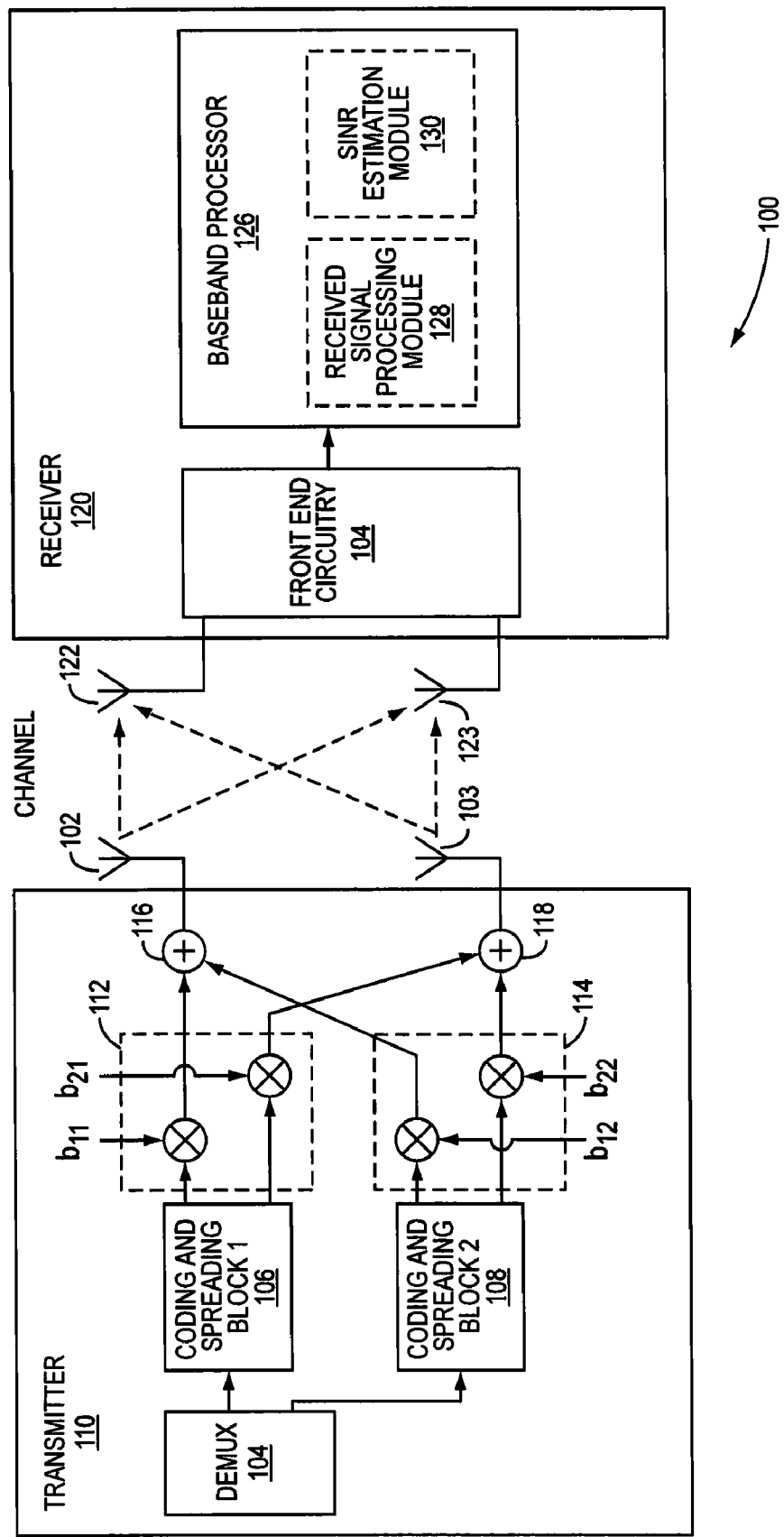
FIG. 1 illustrates a block diagram of an embodiment of a MIMO system including a wireless transmitter and a wireless receiver.

FIG. 1 illustrates an embodiment of a MIMO system 100. The MIMO system 100 includes a transmitter 110 such as a Node B base station and a receiver 120 such as UE. The transmitter 110 and receiver 120 each have a plurality of antennas 102, 103, 122, 123 for implementing MIMO communication. Data can be transmitted in a single stream or multiple streams from the transmitter 110 to the receiver 120 over a channel depending on the mode of communication. For ease of explanation only, operation of the transmitter 110 and receiver 120 are described next with reference to single-stream and dual-stream data transmissions. However, the SINR estimation embodiments described herein are broadly applicable to the transmission of any number of data streams in a MIMO system and are readily extendible as a function of the number of transmit and receive antennas employed by the MIMO system.

With this understanding, operation of the transmitter 110 is described next with respect to the D-TxAA MIMO transmission scheme. The transmitter 110 includes a demultiplexer 104 for controlling the flow of data to coding and spreading blocks 106, 108 associated with each antenna 102, 103 as a function of the data transmission mode. The coding and spreading blocks 106, 108 perform data encoding and modulation. For single-stream data transmissions, a single data stream is encoded and modulated by the first coding and spreading block 106, precoded via a first set of multipliers 112 and transmitted through both antennas 102, 103. For dual-stream data transmissions, a first data stream is encoded and modulated by the first coding and spreading block 106 and a second data stream is similarly encoded and modulated by the second coding and spreading block 108. Precoding is applied to the first data stream via the first set of multipliers 112 and to the second data stream via a second set of multipliers 114. A first precoded part of the first data stream is combined with a first precoded part of the second data stream via a first signal combiner 116. A second precoded part of the first data stream is similarly combined with a second precoded part of the second data stream via a second signal combiner 118. Both data streams are then transmitted on the same orthogonal spreading code(s) and thus are susceptible to code reuse interference.

In both the single-stream and dual-stream modes, precoding is applied to each data stream prior to transmission to improve system performance. For example, in the single-stream mode, the same data stream is transmitted through both antennas 102, 103 using one set of stream-specific antenna weights, e.g., {b11, b21}. In the dual-stream mode, both data streams are transmitted through both antennas 102, 103 using two sets of stream-specific antenna weights, e.g., {b11, b21} for the first stream and {b12, b22} for the second stream. In both data transmission modes, the stream-specific antenna weights, which can be determined by the receiver 120 and fed back to the transmitter 110, are selected so that the beams emanating from the transmit antennas 102, 103 are generally orthogonal. Any type of suitable linear or nonlinear precoding can be employed at the transmitter 110. The transmitted data is then carried over the channel to the receiver 120.

The receiver 120 includes front end circuitry 124 for filtering and down-converting received signals into a baseband signal. The receiver 120 also has a baseband processor 126. The baseband processor 126 includes a received signal processing module 128 for processing the baseband signal and an SINR estimation module 130 for generating SINR estimates based on pilot channel information. Described next in more detail is an SINR estimation embodiment implemented by the baseband processor 126 for both single and dual-stream data transmission modes that implicitly accounts for the effects of both code-reuse and precoding which are present in MIMO schemes such as D-TxAA. As previously mentioned herein, the SINR estimation embodiment is described for single-stream and dual-stream data transmission schemes for ease of explanation only. However, the SINR estimation technique is broadly applicable to the transmission of any number of data streams in a MIMO system.

For ease of description only, the embodiments described herein assume that the pilot scheme is configured in the so-called diversity pilot mode which is specified for the case of two transmit antennas, which is the case when either transmit diversity or MIMO is configured. In this mode, the pilot signal transmitted from each of the two transmit antennas 102, 103 utilizes the same channelization code. However, the pilot symbol patterns are orthogonal over two symbol periods and are defined below. Alternatively, the pilot scheme may be configured using the primary common pilot (P-CPICH) on the first antenna and the secondary common pilot (S-CPICH) on the second transmit antenna. In this case the channelization codes used on the P- and S-CPICHs are orthogonal. Those skilled in the art will recognize that the basic principles of the invention apply broadly to either pilot scheme.

For the diversity pilot mode assumed herein, let $$c_{p,1}(i) = \frac{1}{\sqrt{2}}(1+j)$$

be the constant-valued pilot symbol sequence transmitted on the first transmit antenna 102. The pilot symbol sequence $c_{p,2}(i)$ transmitted on the second transmit antenna 103 is given by:

$$c_{p,2}(i) = m(i)c_{p,1}(i), i=1\ldots 10 \quad (11)$$

where the sequence m(i) is given by:

$$m(i) = \begin{cases} \{+1,-1,-1,+1,+1,-1,-1,+1+1,-1\}, & (12) \\ \quad \text{even-numbered slots} \\ \{-1,+1,+1,-1,-1,+1,+1,-1,-1,+1\}, \\ \quad \text{odd-numbered slots} \end{cases}$$

Using this pilot scheme, per-stream SINRs which account for precoding and code-reuse interference can be estimated by the baseband processor 126 of the receiver 120 using the following approach.

Figure 2:
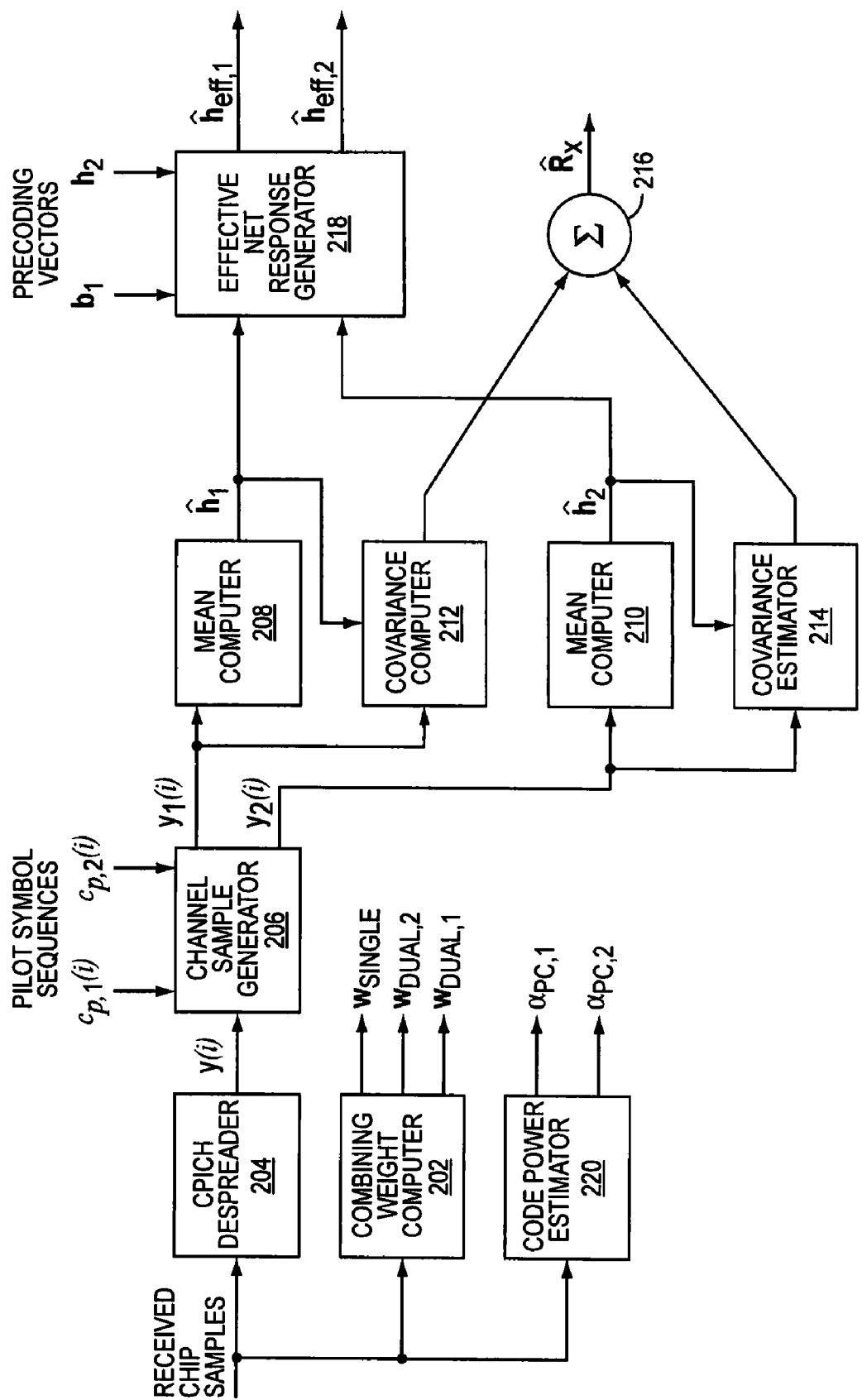
FIG. 2 illustrates a block diagram of an embodiment of a received signal processing module included in or associated with a baseband processor of the receiver of FIG. 1.

FIG. 2 illustrates an embodiment of the received signal processing module 128 included in or associated with the receiver baseband processor 126. The received signal processing module 128 includes a combining weight computer 202 for generating two sets of combining weights appropriate for demodulation of the data channel (e.g. HS-DSCH). The first set of combining weights, denoted $w_{single}$ applies for the case of single-stream data transmission. The second set of combining weights, denoted $\{w_{dual,1}$ and $w_{dual,2}\}$ applies for the case of dual-stream data transmission. For dual-stream data transmission, $w_{dual,1}$ applies to the first data stream and $w_{dual,2}$ applies to the second data stream. The combining weights for the single and dual-stream modes are different in that for the dual-stream mode the weights are designed to suppress interference due to code-reuse, whereas for the single-stream mode no code-reuse interference exists. Any suitable technique can be employed by the combining weight computer 202 for determining the weights, e.g. such as the combining weight computation techniques disclosed in U.S. patent application Ser. No. 12/036,323, filed on Feb. 25, 2008, U.S. patent application Ser. No. 12/036,337, filed on Feb. 25, 2008, and U.S. patent application Ser. No. 12/198,973, filed on Aug. 27, 2008, the contents each of which are incorporated herein by reference in their entirety.

A pilot sample despreader component 204 of the received signal processing module 128 despreads the common pilot (e.g. CPICH) using the same finger placements as used to formulate the combining weights. The sequence of despread vectors generated by the pilot sample despreader 204 for a single slot is given by:

$$y(i) = h_1 c_{p,1}(i) + h_2 c_{p,2}(i) + x(i), i=1\ldots K \quad (13)$$

where i indexes the K CPICH symbols transmitted during the slot (e.g. K=10); $h_1$ and $h_2$ are the net channel responses corresponding to the first and second transmit antennas, respectively; and x(i) is a (zero mean) impairment vector consisting of interference and noise, referred to hereafter as simply noise. The noise covariance is denoted herein as $R_x$.

A channel sample generator component 206 of the received signal processing module 128 computes two different length K/2 sequences based on the sequence of despread vectors and the known pilots. The length K/2 sequences are denoted as $y_1(i)$ and $y_2(1)$, and are referred to herein as "channel samples" corresponding to the first and second antennas, respectively. The respective channel samples are computed as:

$$y_1(i) = \frac{1}{2}[y(2i-1)c_{p,1}^*(2i-1) + y(2i)c_{p,1}^*(2i)] \quad (14)$$
$$= h_1 + \frac{1}{2}[x(2i-1)c_{p,1}^*(2i-1) + x(2i)c_{p,1}^*(2i)],$$
$$i = 1 \ldots \frac{K}{2}$$

and $$y_2(i) = \frac{1}{2}[y(2i-1)c_{p,2}^*(2i-1) + y(2i)c_{p,2}^*(2i)] \quad (15)$$
$$= h_2 + \frac{1}{2}[x(2i-1)c_{p,2}^*(2i-1) + x(2i)c_{p,2}^*(2i)],$$
$$i = 1 \ldots \frac{K}{2}$$

Based on the channel samples, mean computer components 208, 210 of the received signal processing module 128 generate unbiased estimates of the respective net channel responses as:

$$\hat{h}_1 = \frac{1}{K/2} \sum_{i=1}^{K/2} y_1(i) \quad (16)$$
$$\hat{h}_2 = \frac{1}{K/2} \sum_{i=1}^{K/2} y_2(i)$$

Covariance computer components 212, 214 and a summer 216 of the received signal processing module 128 generate respective noise covariance estimates also based on the channel samples as:

$$\hat{R}_{x,1} = \frac{1}{K/2-1} \sum_{i=1}^{K/2} [y_1(i) - \hat{h}_1][y_1(i) - \hat{h}_1]^H \quad (17)$$
$$\hat{R}_{x,2} = \frac{1}{K/2-1} \sum_{i=1}^{K/2} [y_2(i) - \hat{h}_2][y_2(i) - \hat{h}_2]^H$$
$$\hat{R}_x = \hat{R}_{x,1} + \hat{R}_{x,2}$$

An effective net channel response generator component 218 of the received signal processing module 128 accounts for the data stream precoding, e.g. as used in D-TxAA by estimating the effective net channel response "seen" by the different data streams, the data streams also being precoded. The precoding vector applied at the transmitter 110 to the first stream is denoted as $b_1 = [b_{11} \ b_{21}]^T$ and the precoding vector applied to the second stream is denoted $b_2 = [b_{12} \ b_{22}]^T$. The effective net channel response generator 218 calculates the respective effective net channel responses based on the corresponding precoding vectors. Unbiased estimates of the respective net channel responses derived from despread pilot samples are given by:

$$\hat{h}_{eff,1} = b_{11}\hat{h}_1 + r_p b_{21}\hat{h}_2$$
$$\hat{h}_{eff,2} = b_{12}\hat{h}_1 + r_p b_{22}\hat{h}_2 \quad (18)$$

where $r_p$ is the ratio of the pilot power allocated to the first transmit antenna 102 with respect to that allocated to the second transmit antenna 103. The pilot power is often balanced across transmit antennas in which case $r_p = 1$. For Rel-7 MIMO, the UE recommends the precoding weights to be applied at the Node B. This recommendation is fed back along with the SINRs, e.g. on the HS-DPCCH uplink control channel. Hence, the effective net channel responses calculated in accordance with equation (18) account for the precoding applied to data streams in either single-stream or multi-stream transmission modes. In single-stream mode, only the first effective net response is relevant.

In addition to precoding, interference arising from code reuse can also be addressed for multi-stream data transmissions. For the case of demodulating a first data stream, the code reuse interference is due to another data stream, e.g. the second stream in dual-stream mode. This introduces an additive term to the noise covariance matrix that is a function of the outer product of the effective net response for the second stream and the power per-code that is allocated to second stream, the power per-code scaling for the second stream being denoted $\alpha_{PC,2}$. A code power estimator 220 calculates the power per-code scaling factor associated with each data stream. Any suitable technique can be employed by the code power estimator 220 or the SINR estimation module 130 for estimating the power per-code scaling terms, e.g. such as the techniques disclosed in U.S. patent application Ser. No. 12/036,368, filed on Feb. 25, 2008 and U.S. patent application Ser. No. 12/036,425, filed on Feb. 25, 2008, the contents each of which are incorporated herein by reference in their entirety. The SINR estimation module 130 generates SINR estimates based on the parametric and non-parametric information provided by the received signal processing module 128.

Figure 3:
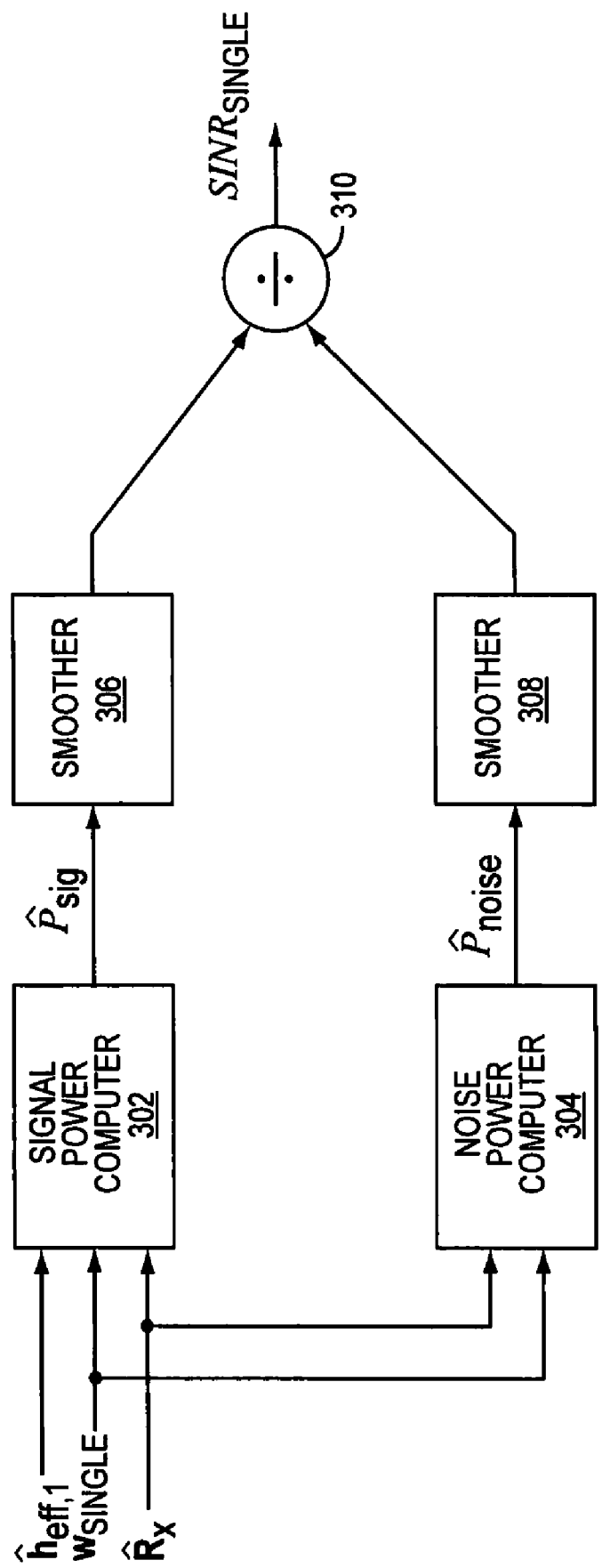
FIG. 3 illustrates a block diagram of an embodiment of a single-stream SINR estimation module included in or associated with a baseband processor of the receiver of FIG. 1.

FIG. 3 illustrates an embodiment of the SINR estimation module 130 included in or associated with the receiver baseband processor 126 as adapted for single-stream data transmission mode. A signal power computer component 302 of the SINR estimation module 130 calculates an unbiased estimate of the per-slot signal power as:

$$\hat{P}_{sig} = |w_{single}^H \hat{h}_{eff,1}|^2 - \frac{1}{K/2} w_{single}^H \hat{R}_x w_{single} \quad (19)$$

A noise power computer component 304 of the SINR estimation module 130 calculates an unbiased estimate of the noise power as:

$$\hat{P}_{noise} = w_{single}^H \hat{R}_x w_{single} \quad (20)$$

Like equation (8), the subtractive term in equation (19) represents the removal of bias in the signal power estimate that occurs due to noise in the estimate of the effective net channel response.

Signal smoothing components 306, 308 of the SINR estimation module 130 can smooth the signal and noise power estimates, respectively, over a number of slots e.g. by time-averaging. A signal divider 310 yields a single-stream SINR estimate as:

$$SINR_{single} = \frac{\langle \hat{P}_{sig} \rangle}{\langle \hat{P}_{noise} \rangle} \quad (21)$$

The single-stream SINR estimate is obtained in a non-parametric manner by measurement based on despread pilot samples such as despread CPICH samples. Unlike conventional CPICH-based SINR estimation techniques, precoding is accounted for according to the single-stream SINR estimation embodiments described herein. The SINR estimation module 130 reduces the precoding-induced mismatch between the data channel (e.g. HS-DSCH) which employs precoding and the pilot channel (e.g. CPICH) which does not by accounting for the data stream precoding employed prior to single-stream data transmission.

Figure 4:
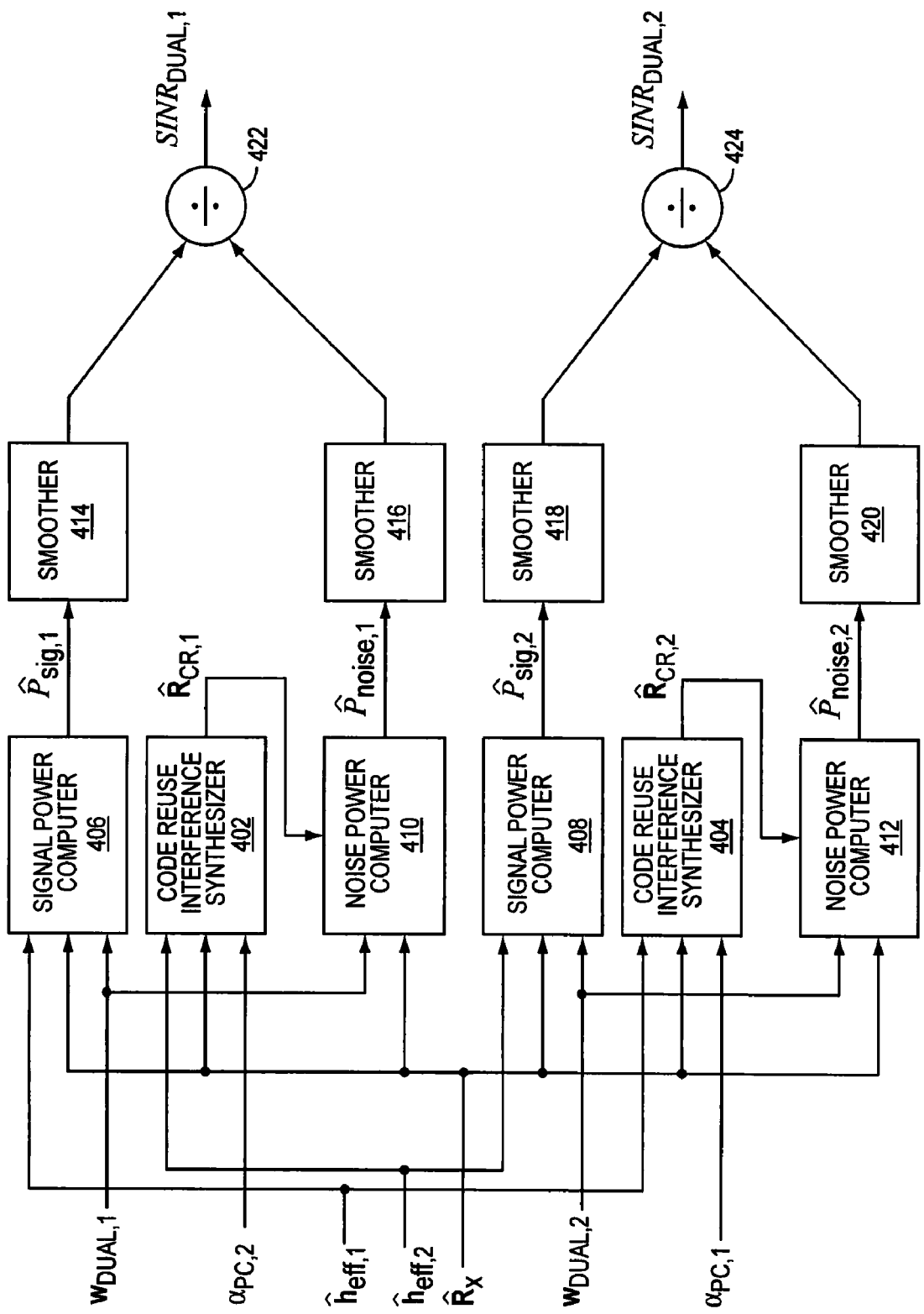
FIG. 4 illustrates a block diagram of an embodiment of a multi-stream SINR estimation module included in or associated with a baseband processor of the receiver of FIG. 1.

FIG. 4 illustrates an embodiment of the SINR estimation module 130 as adapted for multi-stream data transmission. In contrast to the case of single-stream data transmission, the SINR estimation for multi-stream transmission is a combination of non-parametric and parametric approaches. The parametric approach explicitly accounts for the code-reuse interference that occurs in multi-stream data transmission mode. This interference occurs only on the data channel (e.g. HS-DSCH). To account for this interference which is not present on the pilot channel (e.g. CPICH), the SINR estimation module 130 modifies the noise power estimate to include a term that synthesizes the effect code reuse interference has on the data streams in a parametric fashion.

A first code reuse interference synthesizer component 402 of the SINR estimation module 130 calculates the parametric term used to synthesize the code-reuse interference from the perspective of demodulating the first stream as given by:

$$\hat{R}_{CR,1} = \alpha_{PC,2}\left(\hat{h}_{eff,2}\hat{h}_{eff,2}^H - \frac{1}{K/2}\hat{R}_x\right) \quad (22)$$

The subtractive term in equation (22) corresponds to the removal of bias that occurs due to noise in the estimate of the effective net channel response. A second code reuse interference synthesizer component 404 similarly calculates the parametric term used to synthesize the code-reuse interference from the perspective of demodulating the second stream as given by:

$$\hat{R}_{CR,2} = \alpha_{PC,1}\left(\hat{h}_{eff,1}\hat{h}_{eff,1}^H - \frac{1}{K/2}\hat{R}_x\right) \quad (23)$$

The terms $\alpha_{PC,1}$ and $\alpha_{PC,2}$ in equations (22) and (23) represent the power per-code scaling allocated to the first and second data streams, respectively, as previously described herein.

First and second signal power computer components 406, 408 of the SINR estimation module 130 generate unbiased estimates of the per-slot signal power for the first and second streams, respectively, as given by:

$$\hat{P}_{sig,1} = |w_{dual,1}^H \hat{h}_{eff,1}|^2 - \frac{1}{K/2} w_{dual,1}^H \hat{R}_x w_{dual,1} \quad (24)$$

$$\hat{P}_{sig,2} = |w_{dual,2}^H \hat{h}_{eff,2}|^2 - \frac{1}{K/2} w_{dual,2}^H \hat{R}_x w_{dual,2}$$

First and second noise power computer components 410, 412 of the SINR estimation module 130 generate unbiased estimate of the respective noise powers as given by:

$$\hat{P}_{noise,1} = w_{dual,1}^H [\hat{R}_x + \hat{R}_{CR,1}] w_{dual,1}$$

$$\hat{P}_{noise,2} = w_{dual,2}^H [\hat{R}_x + \hat{R}_{CR,2}] w_{dual,2} \quad (25)$$

In the noise power expressions of equation (25), the effect of code-reuse interference is synthesized by adding the respective terms $\hat{R}_{CR,1}$ and $R_{CR,2}$ to the measured noise covariance $\hat{R}_x$ to explicitly account for code-reuse interference. Accordingly, the multi-stream SINR estimation embodiment is a combination of non-parametric and parametric approaches. Respective smoothing components 414, 416, 418, 420 of the SINR estimation module can smooth e.g. by time-averaging the corresponding signal and noise powers over a number of slots. Signal dividers 422, 424 yield dual-stream SINR estimates for the first and second data streams, respectively, as given by:

$$SINR_{dual,1} = \frac{\langle \hat{P}_{sig,1} \rangle}{\langle \hat{P}_{noise,1} \rangle} \quad (26)$$

$$SINR_{dual,2} = \frac{\langle \hat{P}_{sig,2} \rangle}{\langle \hat{P}_{noise,2} \rangle}$$

The following steps are performed by the baseband processor 126 of the receiver 120 for producing both single and dual-stream SINR estimates. The baseband processor 126 obtains single-stream combining weights $w_{single}$ and dual-stream combining weights $w_{dual,1}$ and $w_{dual,2}$ as well as precoding vectors $b_1$ and $b_2$ on which the SINR estimates are to be based. The pilot channel (e.g. CPICH) is despread using the same finger placements as used to generate the combining weights to produce the length-K sequence of despread vectors $y(i)$ given by equation (13). Using equations (14) and (15), two length-K/2 sequences of channel samples $y_1(i)$ and $y_2(i)$ are computed based on the sequence of despread vectors $y(i)$ and the known pilot sequences $c_{p,1}(i)$ and $c_{p,2}(i)$ for the two transmit antennas. The net channel response estimates $\hat{h}_1$ and $\hat{h}_2$ are computed via the mean of the channel samples (equation 16). The noise covariance estimate 1 is calculated via the covariance of the channel samples (equation 17). The effective net-response estimates $\hat{h}_{eff,1}$ and $\hat{h}_{eff,2}$ are calculated based on the corresponding estimated net responses $\hat{h}_1$ and $\hat{h}_2$ and precoding vectors $b_1$ and $b_2$ (equation 18).

A single-stream SINR estimate is produced by calculating per-slot signal and noise power estimates based on the single-stream combining weights $w_{single}$, the effective net response $\hat{h}_{eff,1}$ and the estimated noise covariance $\hat{R}_x$ (equations 19 and 20). The per-slot signal and noise power estimates can be optionally smoothed. The single-stream SINR estimate is calculated using the optionally smoothed signal and noise power estimates (equation 21).

A dual-stream SINR estimate is produced by obtaining estimates of power per-code scaling factors $\alpha_{PC,1}$ and $\alpha_{PC,2}$ associated with the first and second data streams, respectively. The code-reuse interference terms $\hat{R}_{CR,1}$ and $\hat{R}_{CR,2}$ are synthesized based on the corresponding effective net response estimates $\hat{h}_{eff,1}$ and $\hat{h}_{eff,2}$, the estimated per-code powers $\alpha_{PC,1}$ and $\alpha_{PC,2}$ and the estimated noise covariance $\hat{R}_x$ (equations 22 and 23). Per-slot signal and noise power estimates are calculated for the first and second data streams, respectively, based on the dual-stream combining weights $w_{dual,1}$ and $w_{dual,2}$, effective net response estimates $\hat{h}_{eff,1}$ and $\hat{h}_{eff,2}$, estimated code-reuse interference terms $\hat{R}_{CR,1}$ and $\hat{R}_{CR,2}$ and the estimated noise covariance $\hat{R}_x$ (equations 24 and 25). The per-slot signal and noise power estimates can be optionally smoothed. The dual-stream SINR estimates for each data stream are calculated using the optionally smoothed signal and noise power estimates (equation 26).

The MIMO SINR estimation embodiments disclosed herein have complexity on the same order of magnitude as conventional CPICH-based approaches for non-MIMO systems while yielding more accurate data stream SINR estimates. In addition, the SINR estimation embodiments disclosed herein retain the benefits of non-parametric CPICH-based approaches which yield accurate SINR estimates that inherently account for un-modeled effects such as intercell interference, RF impairments, etc. The SINR estimation embodiments disclosed herein also eliminate mismatch between the data channel (e.g. HS-DSCH), for which the SINR estimates are intended, and the pilot channel (e.g. CPICH), which is used as the basis of the SINR estimates. This yields accurate SINR estimates which compensate for the mismatch that arises due to precoding and/or code-reuse interference. The SINR estimation embodiments disclosed herein can be readily applied to MIMO systems that do not employ precoding by setting the precoding vectors to $b_1=[1\ 0]$ and $b_2=[0\ 1]$, respectively. In this case, many of the computation steps simplify since the effective net channel response associated with each data stream becomes equal to the net channel response corresponding to each physical transmit antenna, i.e. $\hat{h}_{eff,1}=\hat{h}_1$, $\hat{h}_{eff,2}=\hat{h}_2$, etc. The SINR estimation embodiments disclosed herein can also be readily expanded beyond dual-stream data transmission schemes by calculating the additional appropriate terms relating to each additional data stream.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of estimating by a baseband processor in a wireless receiver a signal to interference-plus-noise ratio (SINR) for a single data stream transmitted from a plurality of antennas and for multiple data streams transmitted from the plurality of antennas, using the same set of spreading codes, the method comprising:

calculating by the baseband processor a signal power estimate for the single data stream and for each of the multiple data streams that accounts for precoding applied to the corresponding data stream prior to transmission;

calculating by the baseband processor a noise power estimate for the single data stream as a function of noise covariance and for each of the multiple data streams as a function of the noise covariance and code reuse interference associated with the multiple data streams being transmitted using the same set of spreading codes; and calculating by the baseband processor an SINR estimate for the single data stream and for each of the multiple data streams based on the signal power estimate and the noise power estimate calculated for the corresponding data stream.

2. The method of claim 1, comprising calculating by an SINR estimation module of the baseband processor the signal power estimate for the single data stream and for each of the multiple data streams as a function of a set of combining weights derived for the corresponding data stream and an effective net channel response estimate representing the channel experienced by the corresponding data stream after precoding.

3. The method of claim 2, comprising estimating by a received signal processing module of the baseband processor the effective net channel response experienced by the single data stream and each of the multiple data streams as a function of a net channel response estimate associated with each of the plurality of antennas and precoding information associated with the corresponding data stream.

4. The method of claim 3, comprising calculating by the received signal processing module of the baseband processor the net channel response estimate associated with each of the plurality of antennas based on despread pilot samples transmitted from the corresponding antenna.

5. The method of claim 2, comprising calculating by the SINR estimation module of the baseband processor the noise power estimate for the single data stream based on the noise covariance and the set of combining weights derived for the single data stream.

6. The method of claim 2, comprising calculating by the SINR estimation module of the baseband processor the noise power estimate for each of the multiple data streams based on the noise covariance, the code reuse interference and the set of combining weights derived for the corresponding one of the multiple data streams.

7. The method of claim 1, comprising estimating by an SINR estimation module of the baseband processor the code reuse interference associated with each of the multiple data streams as a function of a power per-code scaling factor associated with each of the other ones of the multiple data streams and an effective net channel response estimate representing the channel experienced by each of the other ones of the multiple data streams after precoding.

8. The method of claim 7, comprising estimating by a received signal processing module of the baseband processor the effective net channel response experienced by each of the multiple data streams as a function of a net channel response estimate associated with each of the plurality of antennas and precoding information associated with the corresponding one of the multiple data streams.

9. The method of claim 8, comprising calculating by the received signal processing module of the baseband processor the net channel response estimate associated with each of the plurality of antennas based on despread pilot samples transmitted from the corresponding antenna.

10. The method of claim 7, comprising removing bias from each code reuse interference estimate that occurs based on noise in the corresponding effective net channel response estimate by the SINR estimation module of the baseband processor.

11. The method of claim 7, comprising calculating by the SINR estimation module of the baseband processor the noise power estimate for each of the multiple data streams based on the noise covariance, the code reuse interference estimated for the corresponding one of the multiple data streams and a set of combining weights derived for the corresponding one of the multiple data streams.

12. A wireless receiver operable to estimate a signal to interference-plus-noise ratio (SINR) for a single data stream transmitted from a plurality of antennas and for multiple data streams transmitted from the plurality of antennas, using the same set of spreading codes, the wireless receiver comprising a baseband processor operable to:
- calculate a signal power estimate for the single data stream and for each of the multiple data streams that accounts for precoding applied to the corresponding data stream prior to transmission;
- calculate a noise power estimate for the single data stream as a function of noise covariance and for each of the multiple data streams as a function of the noise covariance and code reuse interference associated with the multiple data streams being transmitted using the same set of spreading codes; and
- calculate an SINR estimate for the single data stream and for each of the multiple data streams based on the signal power estimate and the noise power estimate calculated for the corresponding data stream.

13. The wireless receiver of claim 12, wherein the baseband processor comprises an SINR estimation module operable to calculate the signal power estimate for the single data stream and for each of the multiple data streams as a function of a set of combining weights derived for the corresponding data stream and an effective net channel response estimate representing the channel experienced by the corresponding data stream after precoding.

14. The wireless receiver of claim 13, wherein the baseband processor comprises a received signal processing module operable to estimate the effective net channel response experienced by the single data stream and each of the multiple data streams as a function of a net channel response estimate associated with each of the plurality of antennas and precoding information associated with the corresponding data stream.

15. The wireless receiver of claim 14, wherein the received signal processing module is operable to calculate the net channel response estimate associated with each of the plurality of antennas based on despread pilot samples transmitted from the corresponding antenna.

16. The wireless receiver of claim 13, wherein the SINR estimation module is operable to calculate the noise power estimate for the single data stream based on the noise covariance and the set of combining weights derived for the single data stream.

17. The wireless receiver of claim 13, wherein the SINR estimation module is operable to calculate the noise power estimate for each of the multiple data streams based on the noise covariance, the code reuse interference and the set of combining weights derived for the corresponding one of the multiple data streams.

18. The wireless receiver of claim 12, wherein the SINR estimation module is operable to estimate the code reuse interference associated with each of the multiple data streams as a function of a power per-code scaling factor associated with each of the other ones of the multiple data streams and an effective net channel response estimate representing the channel experienced by each of the other ones of the multiple data streams after precoding.

19. The wireless receiver of claim 18, wherein the received signal processing module is operable to estimate the effective net channel response experienced by each of the multiple data streams as a function of a net channel response estimate associated with each of the plurality of antennas and precoding information associated with the corresponding one of the multiple data streams.

20. The wireless receiver of claim 19, wherein the received signal processing module is operable to calculate the net channel response estimate associated with each of the plurality of antennas based on despread pilot samples transmitted from the corresponding antenna.

21. The wireless receiver of claim 18, wherein the SINR estimation module is operable to remove bias from each code reuse interference estimate that occurs based on noise in the corresponding effective net channel response estimate.

22. The wireless receiver of claim 18, wherein the SINR estimation module is operable to calculate the noise power estimate for each of the multiple data streams based on the noise covariance, the code reuse interference estimated for the corresponding one of the multiple data streams and a set of combining weights derived for the corresponding one of the multiple data streams.

* * * * *

UNITED STATES PATENT AND TRADEMARK OFFICE
CERTIFICATE OF CORRECTION

PATENT NO.        : 8,233,517 B2
APPLICATION NO.   : 12/510529
DATED             : July 31, 2012
INVENTOR(S)       : Grant It is certified that error appears in the above-identified patent and that said Letters Patent is hereby corrected as shown below:

In Fig. 1, Drawing Sheet 1 of 4, delete " [FRONT END CIRCUITRY 104] " and insert -- [FRONT END CIRCUITRY 124] --, therefor.

In Column 3, Line 16, delete "CL-1;" and insert -- CL-1, --, therefor.

In Column 10, Line 17, delete " $R_{CR,2}$" and insert -- $\hat{R}_{CR,2}$ --, therefor.

In Column 10, Line 51, delete "1" and insert -- $\hat{R}_x$ --, therefor.

Signed and Sealed this
Fifth Day of February, 2013

Teresa Stanek Rea
*Acting Director of the United States Patent and Trademark Office*